US008175957B1

(12) United States Patent
May

(10) Patent No.: US 8,175,957 B1
(45) Date of Patent: May 8, 2012

(54) CALL FOR QUOTE/PRICE SYSTEM AND METHODS FOR USE IN A WHOLESALE FINANCIAL MARKET

(75) Inventor: Richard Raymond May, Matthews, NC (US)

(73) Assignee: ICAP Services North America LLC, Jersey City, NJ (US)

( * ) Notice: Subject to any disclaimer, the term of this patent is extended or adjusted under 35 U.S.C. 154(b) by 0 days.

(21) Appl. No.: 12/782,031

(22) Filed: May 18, 2010

Related U.S. Application Data

(60) Division of application No. 11/371,704, filed on Mar. 8, 2006, now Pat. No. 7,827,093, which is a continuation of application No. 11/070,746, filed on Mar. 2, 2005, now abandoned.

(51) Int. Cl.
*G06Q 40/00* (2006.01)
(52) U.S. Cl. .......................... 705/37; 705/35; 705/36 R
(58) Field of Classification Search ............... 705/1, 1.1, 705/35, 36, 36 R, 37, 38, 39
See application file for complete search history.

(56) References Cited

U.S. PATENT DOCUMENTS

| 5,375,055 A | 12/1994 | Togher et al. |
| 5,758,328 A | 5/1998 | Giovannoli |
| 6,029,146 A | 2/2000 | Hawkins et al. |
| 6,092,056 A | 7/2000 | Tull, Jr. et al. |
| 6,622,131 B1 | 9/2003 | Brown et al. |
| 6,934,686 B1 | 8/2005 | Rajagopalan |
| 6,983,259 B1 | 1/2006 | Foray et al. |
| 7,024,384 B2 | 4/2006 | Daughtery, III |
| 7,225,169 B1 | 5/2007 | Tresser |
| 7,383,221 B2 | 6/2008 | Howorka |
| 7,680,715 B2 | 3/2010 | Waelbroeck et al. |
| 7,752,121 B2 | 7/2010 | Olsson et al. |
| 7,882,007 B2 * | 2/2011 | Keith ............................... 705/37 |
| 2002/0052827 A1 | 5/2002 | Waelbroeck |
| 2002/0072975 A1 | 6/2002 | Steele et al. |

(Continued)

FOREIGN PATENT DOCUMENTS

EP 0 399 850 A2 11/1990

(Continued)

OTHER PUBLICATIONS

Business Wire; "CBID Markets Launches Electronic Request for Quote Trading"; Tuesday, Sep. 21, 2004; pp. 1-3.*

(Continued)

*Primary Examiner* — Ella Colbert
(74) *Attorney, Agent, or Firm* — Dickstein Shapiro LLP

(57) ABSTRACT

An electronic trading system and associated methods that provide for anonymous pricing data while ensuring the integrity of the system by preventing it from being used for price discovery information only. Methods are included to police the dealers requesting price information and clear rules are implemented to reward the dealer offering the best price. Dealers request price information by submitting an open (not anonymous) request to a broker for a price on an amount of a security or financial instrument, referred to herein as a "Price-For-Call," which results in an anonymous RFQ being sent to a group of other dealers. If more than one dealer in the group responds with a price, only the best price (bid or offer or both) is returned to the requesting dealer and only the dealer offering the best price is rewarded with knowledge of the price information by virtue of the fact that his price traded.

19 Claims, 5 Drawing Sheets

U.S. PATENT DOCUMENTS

| | | |
|---|---|---|
| 2002/0072987 A1 | 6/2002 | Knudsen et al. |
| 2002/0099641 A1 | 7/2002 | Mills et al. |
| 2002/0128950 A1 | 9/2002 | Wu et al. |
| 2002/0128955 A1 | 9/2002 | Brady et al. |
| 2002/0133455 A1 | 9/2002 | Howorka et al. |
| 2002/0152156 A1 | 10/2002 | Tyson-Quah |
| 2002/0165844 A1 | 11/2002 | Lee et al. |
| 2003/0004854 A1 | 1/2003 | Greene et al. |
| 2003/0083973 A1* | 5/2003 | Horsfall ............... 705/37 |
| 2003/0088501 A1 | 5/2003 | Gilbert et al. |
| 2003/0120585 A1 | 6/2003 | Rosenblatt |
| 2003/0149653 A1 | 8/2003 | Penney et al. |
| 2003/0220868 A1* | 11/2003 | May ................... 705/37 |
| 2004/0059666 A1 | 3/2004 | Waelbroeck et al. |
| 2004/0143538 A1 | 7/2004 | Korhammer et al. |
| 2004/0153391 A1 | 8/2004 | Burns et al. |
| 2004/0236636 A1 | 11/2004 | Lutnick et al. |
| 2005/0044027 A1 | 2/2005 | Rodgers et al. |
| 2005/0283426 A1* | 12/2005 | Krishnasami et al. ......... 705/37 |
| 2007/0005484 A1 | 1/2007 | Waelbroeck et al. |

FOREIGN PATENT DOCUMENTS

| | | |
|---|---|---|
| EP | 0 406 026 A2 | 1/1991 |
| EP | 0 411 748 A2 | 2/1991 |
| EP | 0625275 | 11/1994 |
| WO | WO-00/50970 A2 | 8/2000 |
| WO | WO-00/62212 | 10/2000 |
| WO | WO-01/50776 A2 | 7/2001 |
| WO | WO-02/15461 A2 | 2/2002 |

OTHER PUBLICATIONS

Gretchen Morgenson; "Sailing Into Merky Waters; A Trading Network Woos Wall Street, As Questions Arise About a Sister Firm", New York Times; Sunday, Feb. 28, 1999; pp. 1-8.

H.J. Maidenberg; New York Times; "Futures/Options; An Innovation Causes Uproar"; Monday, Feb. 25, 1995; p. 1.

Business Wire; "CBID Markets Launches Electronic Request for Quote Trading"; Tuesday, Sep. 21, 2004; pp. 1-3.

* cited by examiner

FIG. 1

CALL FOR QUOTE/PRICE SYSTEM AND METHODS FOR USE IN A WHOLESALE FINANCIAL MARKET

CROSS REFERENCE TO RELATED APPLICATION APPLICATIONS

This application is a divisional of application Ser. No. 11/371,704, filed on Mar. 8, 2006, which is a continuation of application Ser. No. 11/070,746, filed on Mar. 2, 2005, each of which are hereby incorporated by reference in their entirety.

BACKGROUND OF THE INVENTION (1) Field of the Invention

The present invention relates generally to the field of wholesale brokerage services, and more particularly to the automated or semi-automated provision of a call for quote/price system and associated methods in a wholesale financial market.

(2) Description of the Related Art

The "request for quote/price" (RFQ) method has commonly been used in the financial market to determine the price at which a party might be interested in buying or selling a particular quantity of a financial instrument. In the wholesale (dealer-to-dealer) fixed income securities environment, the RFQ is used to electronically request a quote (bid or offer for a specified amount) from one or more banks. Once an acceptable quote is received, an electronic trading system is typically used to execute a corresponding transaction. Several successful services exist in the market place that use one-to-one and one-to-many RFQ services.

TradeWeb Group LLC offers an anonymous client-to-dealer system that enables institutional investors to simultaneously receive live price quotes for U.S. fixed income securities from a group of designated dealers and to trade those securities instantly. Currenex/FX ALL also provides an anonymous end user price quote system to market makers in the foreign exchange space. Reuters, on the other hand, has long provided an open (not anonymous) dealer-to-dealer service that provides for conversational trading between dealers. See for example, U.S. Pat. No. 5,195,031.

The problem with non-anonymous systems is that they fail to adequately protect the most important information among competitive dealers: dealer specific price information. Price information is always very valuable, even in highly liquid markets, but is critical in less liquid markets, or where no market exists at all. Likewise, in anonymous systems, dealers can use the RFQ for price discovery purposes only, not to trade, and because the dealers cannot be identified by name there is no direct repercussion from using the system in this manner. There is an indirect consequence, however, which is that other dealers may (or more likely, will) not respond to such requests in order to protect their own price information. Another way to look at this situation is that the dealer requesting a price on a specified amount of a security receives value, in the form of knowing where (what price) a dealer would trade, and gives nothing in return, unless a trade occurs. As a result, attempts to implement an anonymous dealer-to-dealer RFQ system have not been successful due to dealer misuse and distrust.

In contrast, if a dealer (Dealer A) sends an RFQ request to a group of banks on the open Reuters system, Dealer A's name is attached to the request. When another dealer (Dealer B) responds to Dealer A, Dealer B's name is attached to the responsive price. As both dealers are identified, the market can police itself because if Dealer A continually requests a price, but does not trade, the other dealers can stop trading with him. Ideally, Dealer A would prefer to be able to request a price from other dealers without having to disclose his name until after the trade has been agreed because this would allow Dealer A to shop for the best price, but as noted above, this leads to RFQ price fishing and ultimate dealer rejection of the trading system.

As also noted above, a related issue exists when a dealer wishes to start a market when no prices currently exist. Illiquid markets are difficult to start because a dealer does not want to offer a price without any knowledge of what the market will bear, but until the dealer offers a price and a spread is created by another dealer, there is no market. In some non-electronic markets operated in developing countries, dealers wishing to trade with each other in the absence of a current price will initially make verbal markets with each other. It would be ideal to create an electronic market that offers the same market initiation feature while preventing dealer misuse and promoting dealer trust.

BRIEF SUMMARY OF THE INVENTION

The present invention is an electronic trading system and associated methods that provide for anonymous pricing data while ensuring the integrity of the system by preventing it from being used for price discovery information only. The present invention also enables the initiation of markets within a electronic trading environment. Methods are included to police the dealers requesting price information and clear rules are implemented to reward the dealer offering the best price. Dealers request price information by submitting an open (not anonymous) request to a broker for a price on an amount of a financial instrument (such as a security), referred to herein as a "Price-For-Call," which results in an anonymous RFQ being sent to a group of other dealers by a broker and not the requesting dealer. If more than one dealer in the group responds with a price, only the best price (bid or offer or both) is returned to the requesting dealer and only the dealer offering the best price is rewarded with knowledge of the price information by virtue of the fact that his price traded.

An alternative embodiment includes a system and method for preventing a requesting trader from not consummating a trade after initiating the Price-For-Call by instituting specific rules and procedures enforced on all participants. An additional alternative embodiment addresses the right to make a market in the absence of the same.

BRIEF DESCRIPTION OF THE DRAWING

FIG. 1 is an illustration of an electronic trading system user interface for a borker accordance with the present invention.

DETAILED DESCRIPTION OF THE INVENTION

Figure 2:
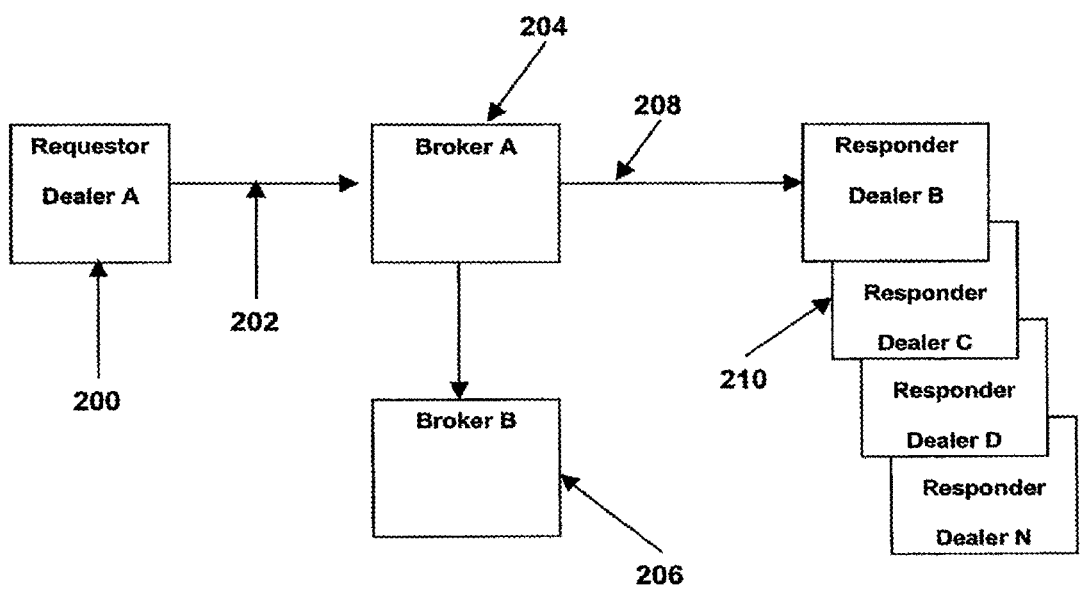
FIG. 2 is a block diagram illustrating the initiation of a Price-For-Call in accordance with a preferred embodiment of the present invention.

Electronic RFQ systems are not successful in the dealer-to-dealer market because price information is too important to give away for free and the importance of such information to dealers varies based on their size in the market. While a requesting dealer (the "requestor") receives information from the market maker (the "responder") when the dealer requests a price and the market maker provides it, the market maker normally receives nothing in return for providing this information because his price will often be left unexecuted as price information becomes known and the market takes over. As a result, the requester will over request to find out additional price information and the market maker will refuse to respond to requests, causing the system to fail.

By adding a human broker between the dealer and the market maker, one who knows who the dealer is and can pass an anonymous request to the market maker(s) on behalf of the dealer while utilizing an electronic trading system, it is possible to overcome the problems associated with prior systems. The electronic system (consisting of a central computer with associated software, memory and means for communicating with a plurality of trading systems operated by a plurality of dealers) offers many advantages over human trading systems in terms of speed, audit trail, electronic delivery of trade data (straight through processing), etc.

Accordingly, in a preferred embodiment of the present invention, Dealer A would request a broker, either electronically (email, instant messaging or direct communication) or via telephone, for a price for an amount of some security, i.e., "get me a price on 20 mm USD vs. Euros," and the broker would in turn activate an electronic RFQ to be sent to a select group of banks. The best bid/best offer response from the bank group would then be made directly available to Dealer A through the electronic trading system so Dealer A could initiate a trade. Alternatively, the broker would be able to initiate the trade on behalf of the dealer in either the dealer's name or in a name pending format, where the name is provided at the close of the transaction.

Establishing workable rules regarding who has access to what information is important. For example, each bank in the group receiving the RFQ to make a price (bid, offer or both) on an amount of a security will be able to make a bid and/or offer for the amount and submit their price. In accordance with one embodiment, the responders must make a BID and OFFER for the full amount (this method will result in only one ticket), and in another embodiment the responder must make a bid and offer, but maybe on an amount smaller than the full amount (this method may result in multiple trades). Once a responder has submitted a price, this price can be changed or canceled in real time at any time by the responder. The trading system will receive all of the prices in near real time as possible, then select the best bid and the best offer only (for the amount requested, this may represent more than one responder if responders are allowed to offer prices for less than the amount requested), and then forward these to the requesting dealer.

The requestor would see the best bid, the best offer, and the number of dealers that have responded, and trade on that information at anytime, even though those prices and the number of dealers responding couldl change at during the process. Not all of the other dealers, however, would see this information. Only the dealers who have the best bid and best offer would be notified that they are the BEST, which would be done by the system displaying the submitted price in a different color or reverse video. All other dealers would know that another dealer was the best, but not what the best price was. Once a trade occurs, the responding dealer whose price was selected for a trade would certainly know they were on the market. In addition, the dealer with the best price not traded would be informed of the trade. For example—dealer A asks for a price on 10 mm USD/MXD and is given a bid of 11.0000 from dealer B, an offer of 11.0100 from dealer C, and a bid of 10.0900 from dealer D. If dealer A then decides to buy 10 mm from dealer C at 11.0100, dealer B (who had the best bid) would be informed of the results, but dealer D would not. Dealers A and C would, of course, know the deal as they are party to it.

Figure 1:
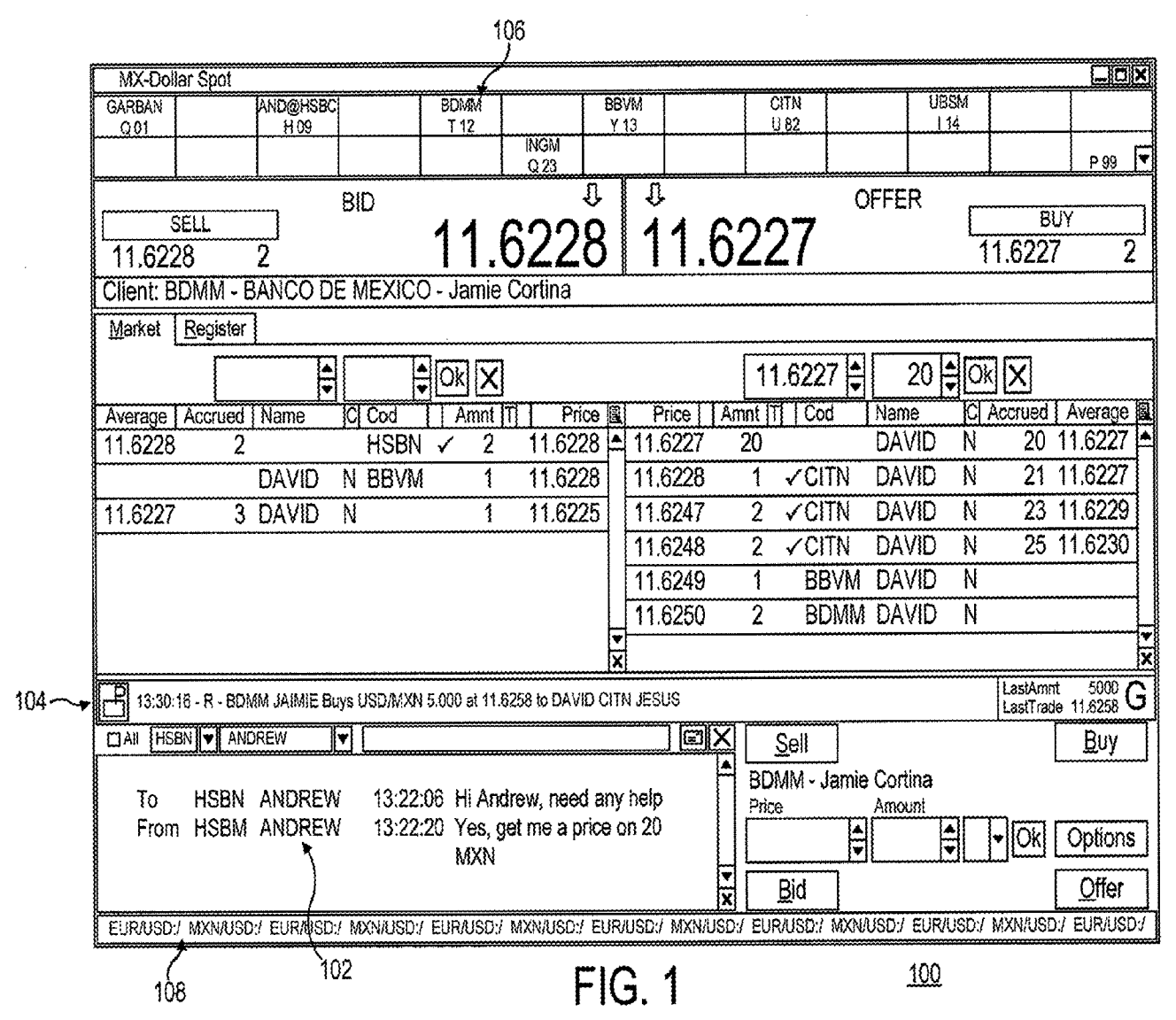

The broker user interface screen 100 illustrated in FIG. 1 is representative of a typical broker user interface for an electronic trading system where the broker is operating as an intermediary between a number of different traders at different dealers, each of which has the ability to communicate with the broker through the interface of the trading system. The trading system could be any type of computerized system capable of operating software that is compatible with and capable of communicating with the central computer system of the electronic trading system. Both systems could use a form of proprietary software or off the shelf software that has been modified to operate in this particular environment, such as a wide variety of web-enabled software that facilitates communication and electronic trading over the Internet and other communications networks.

For purposes of illustrating one aspect of the invention, the securities being traded as illustrated in FIG. 1 are different government issued currencies. However, the invention is not limited to the currency exchange market and has equal applicability to many different types of securities in other markers. Furthermore, the messages and codes used herein are merely intended to illustrate this one example, not limit the scope of the invention.

To initiate the Price-For-Call process, a trader at Bank 1, the asking bank, would call by telephone or, as shown in FIG. 1, message his broker through the instant messaging functionality of the system, for a price on a certain amount of a security. In FIG. 1, in rapid response to the broker's message to Andrew (a trader at HSBN) offering assistance if needed, Andrew asked the broker to get him "a price on 20 MXN," which means the Andrew wants to know the price to either buy or sell 20 million Mexican pesos in U.S. dollars. Before the broker could carry through on Andrew's request, the broker would have had to establish a group of other clients, in this case banks, to which the request for pricing could be sent. Assuming the broker has pre-established one or more lists or groups of Price-For-Call clients for this type of transaction, using the interface, the broker would select the appropriate group, click on the Price-For-Call ("PFC") button 104, enter the amount for which he is requesting a price, and send the request. The Price-For-Call message box would then provide some kind of message to the broker, and possibly to Andrew, confirming that the RFQ was sent, such as "I have made the request," or "Sent Price-For-Call for Andrew/HSBN on 20 MXN."

Alternatively, the user interface could be structured many different ways. For example, the broker could create a group on the fly by simple clicking on the client buttons 106 to add each selected client to the group and then click on the PFC button 104. The broker could also pre-establish groups and then add or delete clients as desired before sending a PFC. Likewise, the broker could select from a number of preset screens adapted to different security trades, such as EUR/USD, and MXN/USD, as is shown at 108. Alternatively, selection of the PFC button 104 might initiate a different process that first enabled the broker to create a group on the fly, to select the currency pair (MXN/USD or something else), enter the amount for pricing, etc. Obviously, the user interface screen could provide this and other similar types of functionality as described herein.

Upon receiving the RFQ from the broker, one or more of the traders from within the group of banks would then respond electronically by providing a bid, an offer, or both in response to the RFQ. The electronic interface screen provided to the banks, through an Internet or Intranet application, or on software loaded onto the bank's computer and in communication with the broker's system, would provide the tools necessary for the bank to respond to the broker in this manner. These tools might include a dialog box for communication with the broker, areas that display the time and remaining time periods for a response, as well as buttons and text boxes for entering a price and amount, arrow keys for quickly increasing or decreasing an entered value, submit, re-submit and cancel options, bid and offer options, etc.

Once a price has been sent by a bank, a message should appear on the bank's interface indicating what the bank had done, i.e., "Sent Price on 20 MXN bid/offer." If this price ended up representing either the best price for bid or offer, the system would identify the price on the dealers screen in a different color. Once another dealer submitted a better price, the color would change back, thereby informing the dealer that he was no longer the best price, but not what the best price was. Alternatively, the trading system could automatically highlight the bank's bid to indicate to that bank that its bid/offer was currently the best. This alternative might be particularly useful and appropriate when the group of banks are given a set period of time during which to make their bids/offers. For example, if a bank submitted a bid/offer and the submitted price was not highlighted, then the bank might be encouraged to submit a better price to see if that would be the best among the banks. In this manner, only the bank with the current best bid/offer would know the best bid/offer and all of the other banks would have to either resubmit or drop from the bidding (cancel or not change their bid/offer). In the end, however, only the bank with the best bid would actually know the final trading price to the last cent. Furthermore, if a trade resulted, the trade would be processed as normal for settlement purposes and listed in both parties blotters, however the trade would not be added to the list of daily trades for data purposes (until the next day), so as to not give any other bank current trade data.

The trader at the asking bank would see the best bid and best offer, perhaps from two different banks, in a similar interface screen. This interface would only permit the trader to select one, either the bid or offer. Again, only the trader and the best bid or best offer bank would see the trade. If the best bid was traded, the best offer might see a message indicating "Traded on the bid," and if the best offer was traded, then the best bid might see "Traded on the offer." Once the trade occurs, the PFC session would end and all participants would see a corresponding message, i.e., "Price-For-Call ended."

In order to properly monitor the banks within a group, the broker will need some information regarding their activity, but providing brokers with active bid and offer prices might tempt the brokers to misuse the information, so the brokers should only be provided with an indication of which banks have responded, but not their prices. This could be done in a number of different ways, such as highlighting the banks name, either in bold or a different color on the broker's interface screen, or by adding some sort of special sign next to each bank that has provided a price, such a blue dot for a bid and a red dot for an offer. Once the trade data is no longer of value in the market, such as at the end of a day, the price data provided by each bank in the group could be made available to the broker, or used to further manage the process and to monitor the activity of the banks. For example, if one bank was constantly under pricing or over pricing the other banks by some large amount, that might be indicative of something of concern to the broker.

Each of the banks would also require some means of indicating to the broker when they want to be included in a Price-For-Call group and when they do not. A simple "ON" or "OFF" switch could be provided on the bank's interface screen to allow the bank to indicate when the bank is accepting PFCs and when it is not. The corresponding portion of the broker's interface would likewise need to change to reflect each bank's current status.

Although the Price-For-Call process described above comes to an end by virtue of a trade, it could also be ended if the trader for the asking bank were to cancel the PFC. The broker could also refuse the trader's request to establish the Price-For-Call if the trader had made a number of requests but not completed many trades. In many cases a trade results in a bilateral contract that requires the credit approval of each party of the other, therefore it is possible that trades can be declined for credit reasons. In this case the responder would not be barred from the process.

Furthermore, the trader (the requestor), or its asking bank, will be prevented from trading in the normal market through the trading system for a predetermined period of time so as to allow the responding banks in the group the first option to trade. This is to stop a dealer asking for a PFC and then immediately thereafter attempting to drive the price in the normal market against the other dealers.

If the trader does not get a best bid or best offer that meets its objective price, then the trader could respond with a Counter-for-Call. In a Counter-for-Call, the trader offers to either buy at a price that is higher than the best bid provided in the original Price-For. Call or sell for a price that is lower than the best offer in the original Price-For-Call. This message would then be communicated to each bank that participated in the original Price-For-Call and would be executed by any of the banks through just a single action, such as the selection of a button to execute the trade. The Counter-For-Call session would end when a bank executed the trade or the trader canceled the Counter-For-Call.

The system and processes associated with the preferred embodiment of the present invention can be further understood with reference to FIG. 2, which is a block diagram illustrating the initiation of a Price-For-Call. Using a telephone, instant messaging, or even a text button and/or box on the user interface screen, Dealer A 200 from among a group of Dealers associated with Broker A, including Dealers B-N, contacts Broker A and initiates or requests a Price-For-Call 202. The Price-For-Call would include the amount in millions to be traded and the market for the trade, i.e., Euro/$, GBP/$, etc. Once again, this example is limited to trading currencies, but the present invention could be utilized in numerous different types of financial market environments. If the user interface was utilized to initiate the Price-For-Call, Broker A 204 might receive a message, such as "Trader A at Dealer A requests PFC on <amount> for <market>."

As there might be multiple brokers handling transactions involving the various traders, the Price-For-Call might be directed to multiple brokers, but only one broker could respond to the request. For example, if there were two brokers, Broker A 204 and Broker B 206, the request might only be routed to Broker A because Trader A at Dealer A is only in Broker A's group. As previously noted, brokers would be able to set up their own groups. One or more buttons or other functions within the broker's user interface would enable this functionality on request.

Within the displayed content of a group, those traders currently accepting Price-For-Call requests would be highlighted in some manner, such as coloring their names blue when the traders have their Price-For-Call functionality on and red when the traders have their Price-For-Call functionality off. If Broker A was routinely monitoring the status of his groups, he might notice that a number of his traders within a group were currently red, which might cause Broker A to reconfigure the group to include more active traders, to select a different pre-configured group, or to make up a new group including only active traders. Once Broker A had selected all of the dealers for a dealer group, Broker A would send the Price-For-Call 208 to the dealers in that group 210 that are currently accepting Price-For-Call. The Price-For-Call could also be sent to other brokers, such as Broker B, so they may respond on behalf of their clients.

Figure 3:
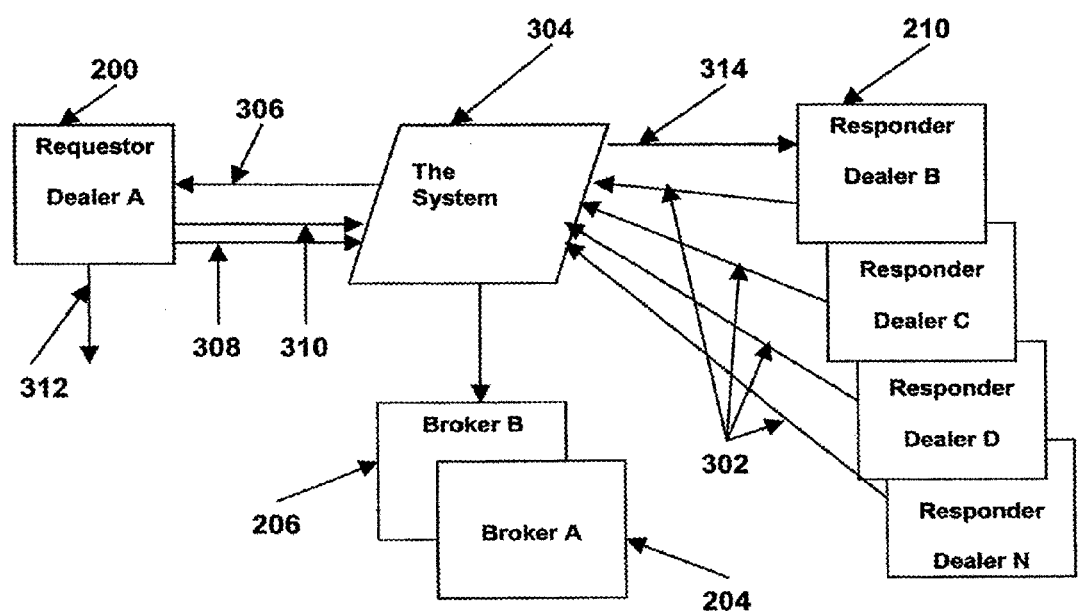
FIG. 3 is a block diagram illustrating the responsive pricing to a Price-For-Call and the corresponding market actions in accordance with a preferred embodiment of the present invention.

Traders receiving the Price-For-Call would see a message on their interface screen, such as "<PFC: Broker A—<amount> for <market>." This message could be made visibly clear to the traders by making it flash, reverse video, etc. If a trader clicked on the message, a dialog box would be generated in which the trader could enter relevant price information, such as the bid and the spread. As illustrated in FIG. 3, each trader from among Dealers B-N 210 participating in the Price-For-Call would send price information 302 to the trading system 304 using the dialog box. Offers would be calculated by the trading system 304 as bid+spread, such that traders only needed to change the bid, and to resend, in order to change the offer. Other options would also be available to the traders. For example, the trader could pick a default price that would be maintained by the trading system 304 using the current market bid or last trade price. Likewise, the spread could be based on the default of the last used spread offered by that trader.

Once the trader selects "send" within the dialog box, the bid or offer is sent to the trading system. Once a price has been sent, the dialog box would change the "send" to "resend" so the trader would know the price was sent. The trader could also cancel the bid or offer at anytime prior to a trade being made on that pricing information. If possible (e.g., if a trade has not already occurred), a cancellation takes immediate effect. The dialog box, which would remain open until the Price-For-Call process had ended, would display the number of responding traders (just the number, not their identities or anything else) and the statues of the trader's own price (e.g. Best, Not the Best, etc.). If the Trader's price was the Best, it would be highlighted in some manner until it was no longer the best, i.e., if another trader updated their price to improve their position.

On Broker A's side, once the Price-For-Call is sent to the traders, the trading system 304 begins to provide Broker A 204 with a results screen, to allow him to monitor the progress and give him sufficient information to be able to chase responses from the group. The dialog would include the name of Dealer A, the number of bids/offers, sorted in price order, and the name of the trader/dealer with the best price. If a trader had not responded, however, they might be listed by name with a Null price indication so Broker A would know they were not participating. Broker A 204 and Broker B 206 could also enter prices manually on behalf of dealers directly into the trading system 304.

Once the trading system 304 has collected all of the bids/offers, within a predetermined period of time (as near real time as possible), it will send the best bid and/or offer 306 to the requesting dealer 200, which might be displayed to Dealer A within a dialog box. The system 304 could also indicate other information, such as the number of traders that responded and details regarding the Price-For-Call, such as the time, market, amount, broker, etc. The best bid and best offer would be displayed as interactive elements, such as buttons, that could be selected by the dealer 200 to either accept the price 308, to counter 310, or to cancel 312.

If Dealer A 200 elects to accept the price 308, either the bid or offer, an execution message 314, which might read "PFC: Dealer A <buys><sells>, <market>, <amount> at <price> to Dealer B," would be generated by the trading system. As illustrated in FIG. 3, the execution message is only illustrated as being sent to Dealer B, but the execution message would be sent to both of the trading parties (in this case Dealer A and Dealer B), as well as the broker. If the financial instrument being traded is a security (financial instrument) that requires credit approval, this may be completed through pre-set credit lines in the system, post trade credit checks by both parties, or by the broker providing a suitable intermediary that has credit available to both parties.

In the event Dealer A finds neither the best bid or the best offer acceptable, dealer A may send a counter 310. The counter price, however, must be higher than the best bid if a buyer and lower than the best offer if a seller. Alternatively, Dealer A may cancel the process and not generate a trade, but doing so may have ramifications. As previously noted, the broker may refuse to allow Dealer A to initiate PFCs in the future, or restrict Dealer A's use of the trading system, or even cause the name of Dealer A, or the name of the trader for Dealer A, to be disclosed to the group. In any case, a record within the trading system will be updated to include the dealer/trader information for future reference and monitoring.

Figure 4:
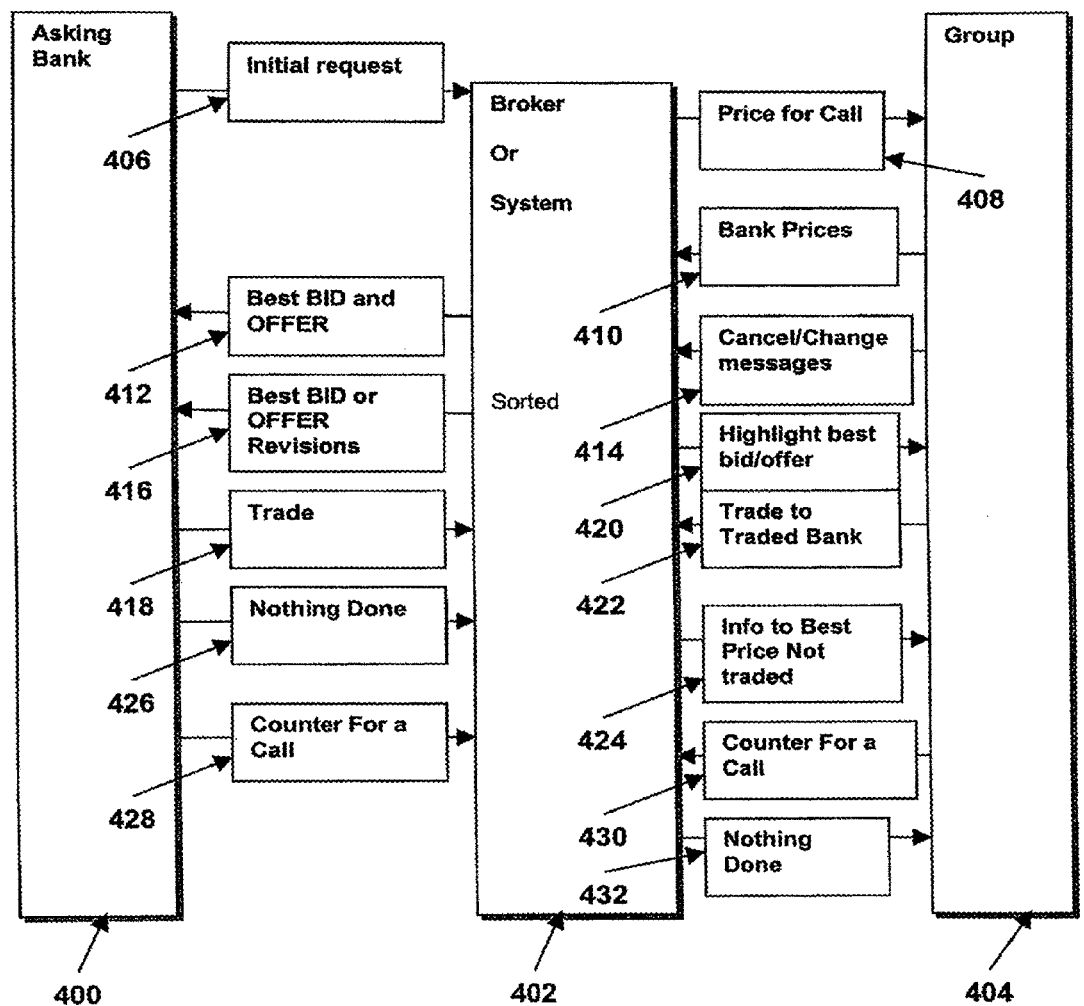
FIG. 4 is a block diagram illustrating message flow between the parties utilizing Price-For-Call in accordance with the present invention.

The message flow between the asking bank or trader 400, the broker and/or trading system 402, and the dealer group 404 is further illustrated FIG. 4. The trader 400 makes an initial request 406 that is submitted either to the broker (for entry in the trading system) or to the trading system 402 directly. The trading system 402 then generates the Price-For-Call 408. In response to the Price-For-Call, each participating member of the dealer group 404 submits their price 410 to the trading system 402. The trading system 402 analyzes the submitted prices and selects the best bid and/or offers 412 and submits just those prices to the asking bank 400. For some predetermined period of time, or until a trade occurs, each participating member of the dealer group can cancel or change their submitted price 414, which might occur when a trader in the group does not receive any notification of having submitted the best bid or best offer, or is expressly notified that the trader's price is not the current best. In such a situation, although the trader would not know what the best bid or best offer was, the trader could change their price in an effort to become the best bid or best offer.

Again, as the traders within the group change their bids/offers, or after a predetermined period of time, or until a trade occurs, the trading system would revise the best bid or best offer prices 416, published to the asking bank 400. If the asking bank initiates a trade 418, the trade is communicated to the trading system 402. The bank that won the Price-For-Call is notified of the best bid/offer 420 and the trade is consummated 422.

If the asking bank does not initiate a trade in response to the best bid or best offer 424, either nothing more is done 426, or the asking bank 400 can respond with a Counter-For-Call 428. As noted above, the counter price must be higher than the best bid if a buyer and lower than the best offer if a seller. One or more traders within the group 404 can then respond to the Counter-For-Call, in which case steps 418, 420 and 422 would essentially be repeated, or nothing would be done 432, in which case, after a predetermined period of time, the Price-For-Call is terminated.

Figure 5:
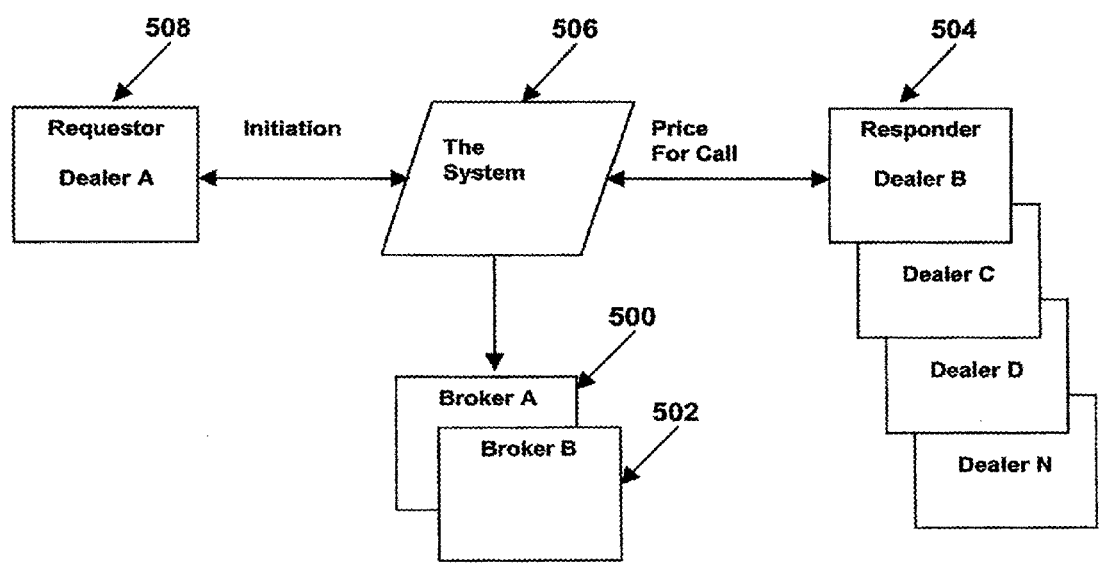
FIG. 5 is a block diagram illustrating the initiation of a Price-For-Call in accordance with an alternative embodiment of the present invention.

FIG. 5 illustrates a first alternative embodiment to the Price-For-Call process described above, which addresses the issue of the dealer, who made the request for Price-For-Call, not trading in response to the best bid/offer, thereby causing other traders to lose interest in using the trading system. This first alternative method introduces a compulsory component that requires the broker, such as Broker A 500 or Broker B 502, to invite a group of traders/dealers 504 to be part of a permanent group and for that group to agree to acceptable rules (which would be compulsory) for participation instituted and monitored by the trading system 506 and the brokers. As a result, the dealers of the group agree to provide liquidity to each other and to price financial instruments based on the knowledge that a trade will always occur. Each dealer in the group would be bound by an agreement to one another to provide liquidity through the PFC function. The agreement would require a high percentage (say 70%) of responses to PFC's and bid offer spreads within acceptable bounds.

In contrast to the preferred embodiment, the first alternative method is electronically originated by the trader 508, not the brokers 500 and 502, although a broker could launch a request on behalf of a trader client. Hence, the entire process is electronic and does not require the trader 508 to contact the brokers by phone or instant messaging to initiate the process.

One of the basic rules for participation in this first alternative method is that the requesting trader 508 must always trade for the amount requested. There are two ways in which this can happen: (1) all members of the group 504 make a market (a bid and an offer, i.e., for a responder that did not want to sell, this might include a best bid and a not so good offer) for the amount, and the entire amount is traded on either the best bid or the best offer; or (2) the requester 508 specifies an entire amount as well as a minimum bid/offer, i.e., 50 mm/10 mm, and the responders 504 know the entire amount will be traded, but not necessarily from just one trader, although a responder could respond with an amount larger than the minimum, up to the entire amount.

As represented in FIG. 5, the manner in which the first alternative method is set up within the trading system 506 and within the user interface screens (including the visual aides provided to users), is very similar to the manner specified in the preferred embodiment and need not be repeated here. For example, Dealer A 508, the requestor, initiates the process, and for each currency pair to be traded, there would be a list of other banks and traders 504 within those banks that would be the responder part of this type of Price-For-Call group. There are some basic differences, however. As noted, Broker A 500 and Broker B 502, do not necessarily initiate the process, although a broker could do so on a dealer's behalf. The group is permanent and is system wide, not at the discretion of an individual broker. If a bank has more than one trader, only one trader is required to make the price.

The brokers would also be included in the set up so the broker can monitor the trading to make sure that all members of the group participate and do so fairly, and to resolve any issues. The broker could also enter requests and response on behalf of trader clients. The requestor must trade and responders must make a market for all of the amount, or at least a minimum amount, if so requested. Because every member of the group must participate, all members of the group are permitted to see the trade reported, but the trade would not be reported outside of the group.

A second alternative method confronts the situation where no actual market exists. In the preferred embodiment and the first alternative, the methods operate to provide a normal amount of liquidity, for the requested amount, in the dealer-to-dealer market place. With respect to some financial instruments, however, such as certain smaller currencies at the beginning of the trading day, there may be no amount upon which a bid/offer could be generated, so the only way in which trades could occur is a market is created. Hence, the second alternative creates the ability for a dealer to get a market started or, in other words, the right to make a market ("M/M").

For example, if no amount of currency was currently being traded between U.S. Dollars (USD) and Mexican Pesos (MXP), the USD/MXP exchange, but the USD/MXP exchange rate at the close of the prior day was 11.5000, a dealer could simply make a market in that currency that was a specified number of points wide. If the dealer notified other dealers of a willingness to trade "30 on $5 mm on an M/M," the dealer would be indicating a willingness to guarantee a price on the stated amount that is 30 points wide to any other dealer willing to trade the dealer's spread. According, if a dealer responded with a bid of 11.5010, then that same dealer must be willing and prepared to also offer 11.5040. Once the responding dealer has specified a price, the requestor must trade one side or the other, that is either buy at 11.5040 or sell at 11.5010. This would make a market at 11.5010 to 11.5040. As noted below, this could work in other ways as well.

In order to distinguish M/M pricing and trades from all other trades, they are illustrated in a manner completely different, i.e., color, symbols, reverse video, etc., from all other pricing and trades on the trading system 304. The user interface screen for the M/M trader will require the option to initiate a M/M. Once selected, a dialog box will be generated to assist the M/M trader in initiating the M/M. It is anticipated that bids will typically be what the requesting trader wishes to place, and that offers will be rare, but both will be generated because the prices for a M/M are always a spread. In the event a market actually exists for the financial instrument, then the trading system will default to the most recent price on the market and M/M will be disabled. If a market does not exist, the system could also, by default, use the last traded price, whenever that might have been, if there is any price to be used.

A further alternative to this embodiment of the invention could be implemented by having the M/M trader choose to add his/her own bid and offer prices, so as to create the spread, enter the amount, and select a button to submit the M/M. The group will then receive a message indicating the specifics of the M/M, such as <M/M USD/MXP Bid 11.5040 Offer 11.5070 on $5 mm). Any trader in the group wishing to trade, called a taker, would then simply need to hit the bid or lift the offer (the taker can only trade one side). If for any reason the messages failed or the taker failed to trade, then a message would be sent to the M/M trader indicating that the taker failed to trade the M/M.

As a further alternative to the above second alternative embodiment, trading rules could also be established that force the M/M trader to trade if the taker makes either of the prices bid/offered. The broker could also enter the price for the M/M trader, or even enter a Pink (broker) price (meaning the trader's name is pending), so as to keep the name of the M/M trader confidential until a trade occurs.

While the present invention has been described in conjunction with specific embodiments, including a preferred embodiment and numerous alternatives, it is evident that numerous additional alternatives, modifications and variations will be apparent to those skilled in the art of the foregoing description. For example, while the present invention has been described for use in a foreign exchange environment, these models could be applied to any electronic trading environment, including, but not limited to government securities, other fixed income securities, equities exchange traded instruments, or over the counter derivatives. Accordingly, the present invention is not intended to be limited to just the described embodiments, and should be interpreted to include all such alternatives, modifications and variations.

What is claimed is:

1. An electronic trading system for facilitating trading in a financial instrument in response to an anonymous request by a requesting dealer for pricing on an amount of said financial instrument from a group of dealers, comprising:
   a first trading system configured to permit said requesting dealer to transmit an open request for pricing on said amount of said financial instrument from a plurality of other dealers;
   a central computer system, including memory and a software controller, in communication with said first trading system, the central computer system being configured to receive said open request, select said group of dealers from said plurality of other dealers, and transmit said anonymous request on behalf of said requesting dealer to said group of dealers; and
   a plurality of second trading systems, utilized by said group of dealers, configured to receive said anonymous request and transmit from one or more of said dealers from said group of dealers pricing information for said amount of said financial instrument to said central computer system,
   said central computer system being operative to select a best price from said pricing information transmitted from one or more of said dealers from said group of dealers and to transmit only said best price to said first trading system so as to permit said requesting dealer to trade at said best price, to cancel said anonymous request, or to issue a counter to said best price.

2. The trading system of claim 1, wherein said central computer system is further operative to monitor said requesting dealer and said group of dealers for any action that would compromise said electronic trading system to said requesting dealer and said plurality of other dealers.

3. The trading system of claim 2, wherein a monitored requesting dealer that cancels said anonymous request is policed by said central computer system.

4. The trading system of claim 3, where said central computer system polices said requesting dealer that cancels said anonymous request by publishing said requesting dealer's identification to said group of dealers.

5. The trading system of claim 3, where said central computer system polices said requesting dealer that cancels said anonymous request by preventing said requesting dealer from making one or more of said anonymous requests in the future.

6. The trading system of claim 3, where said central computer system polices said requesting dealer that cancels said anonymous request by preventing said requesting dealer from using said electronic trading system for other forms of securities trading.

7. The trading system of claim 2, wherein said plurality of second trading systems are configured to permit each of said group of dealers to cancel or change said pricing information within a predetermined period of time.

8. The trading system of claim 7, wherein said central computer system is operative to identify to a current best price to one of said plurality of second trading systems, and wherein said one of said plurality of second trading systems is operative to highlight said current best price for as long as said current best price remains said current best price within said predetermined period of time.

9. The trading system of claim 7, wherein said pricing information includes a bid and an offer, wherein said offer is equal to said bid plus a spread, and wherein each of said groups of dealers is capable of changing said offer by changing said bid in near real time within said predetermined period of time.

10. The trading system of claim 7, wherein said pricing information for one or more of said group of dealers is determined using a default pricing rule.

11. The trading system of claim 10, wherein said default pricing rule is based on a current market price of said financial instrument.

12. The trading system of claim 10, wherein said default pricing rule is based on a last price at which said financial instrument was traded.

13. The trading system of claim 10, wherein said default pricing rule is based on a last spread used by one of said group of dealers.

14. The trading system of claim 2, wherein group of dealers is a permanent group that includes said requesting dealer, and wherein said permanent group agrees to be bound by a set of rules and to be monitored and policed by said central computer system.

15. The trading system of claim 14, wherein said set of rules includes a rule that said requesting dealer must trade said amount of said financial instrument.

16. The trading system of claim 15, wherein said must trade rule requires said requesting dealer to trade said amount at said best price with one dealer of said group of dealers.

17. The trading system of claim 15, wherein said must trade rule requires said requesting dealer to further specify a minimum amount of said financial instrument that each one dealer of said group of dealers is willing to trade and requires said dealer to trade said amount by trading said amount with one dealer of said group of dealers or by combining said minimum amount specified by one or more dealers of said group dealers.

18. The trading system of claim 1, wherein said counter to said best price is either a commitment to buy at a price higher than a best bid corresponding to said best price or a commitment to sell at a price lower than a best offer corresponding to said best price.

19. An electronic trading system for facilitating trading in a financial instrument in response to an anonymous request by a requesting dealer for pricing on an amount of said financial instrument from a group of dealers, comprising:
   a central computer system, including memory and a software controller, the central computer system being configured to receive an open request from a requesting dealer via a first trading system, the request being for pricing on said amount of said financial instrument from a plurality of other dealers, the central computer system selecting said group of dealers from said plurality of other dealers, and transmitting said anonymous requests on behalf of said requesting dealer to said group of dealers; wherein,
   said central computer system being configured to receive from one or more of said dealers from said group of dealers pricing information for said amount of said financial instrument, said pricing information being transmitted to the central computer system via a plurality of second trading systems utilized by said group of dealers;

said central computer system being operative to select a best price from the said pricing information transmitted from one or more of said dealers from said group of dealers and to transmit only said best price to said first trading system so as to permit said requesting dealer to trade at said best price, to cancel said anonymous request, or to issue a counter to said best price.

* * * * *